No. 852,802. PATENTED MAY 7, 1907.
W. T. SEARS.
VALVE.
APPLICATION FILED APR. 16, 1906.
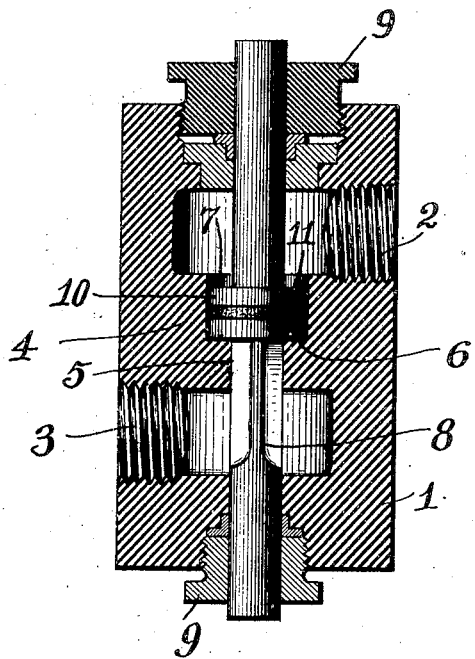
Witnesses:
Elmer R. Shipley.
M. S. Belden.
Willard Thomas Sears
Inventor
by James W. See
Attorney

UNITED STATES PATENT OFFICE.

WILLARD THOMAS SEARS, OF PHILADELPHIA, PENNSYLVANIA, ASSIGNOR TO NILES-BEMENT-POND COMPANY, OF JERSEY CITY, NEW JERSEY.

VALVE.

No. 852,802. Specification of Letters Patent. Patented May 7, 1907.

Original application filed April 17, 1905, Serial No. 255,888. Divided and this application filed April 16, 1906. Serial No. 311,856.

*To all whom it may concern:*

Be it known that I, WILLARD THOMAS SEARS, a citizen of the United States, residing at Philadelphia, Philadelphia county, Pennsylvania, have invented certain new and useful Improvements in Valves, (Case B,) of which the following is a specification.

This application is a division of my application 255,888, filed April 17th, 1905.

This invention, pertaining to improvements in valves, will be readily understood from the following description taken in connection with the accompanying drawing which is a vertical diametrical section of a valve construction exemplifying my invention.

In valves designed for use with liquids at high pressure, say in excess of 1,000 pounds per square inch, a serious annoyance arises from the difficulty of keeping the valves tight, foreign matter, having a very serious effect upon metallic contact surfaces at these high pressures. If relief be sought in the substitution of leather or a like material about the contacting surfaces, then the leather is found to be not durable. By means of my invention, I so combine metal to metal contacts and leather to metal contacts, that I secure a tight and easily maintained valve.

In the drawing:—1, indicates the valve body which may be of any ordinary form: 2, one pipe-opening thereto: 3, the second pipe-opening thereto: 4, the partition between the pipe-openings: 5, an opening through this partition and forming, when opened by the valve, the communication between the two pipe-openings: 6, a seat formed around the opening 5: 7, a counterbore in the upper portion of opening 5, the annular floor of this counterbore forming the seat 6: 8, the stem of the valve, this stem being a fluted guide stem fitting the opening 5, but, so far as the stem is concerned, leaving a liberal passage-way for the fluid through the opening. 9, stuffing-boxes at the projecting portion of the valve-stem: 10, a piston on the valve-stem, fitting the counterbore 7, its lower face stopping downwardly against seat 6: and 11, a packing of leather or analogous material carried by the body of the piston and engaging the bore of the counterbore.

The valve is illustrated as being closed, the tightness of the closure being secured by the contact of the packing with the wall of the opening in which the piston works. The contact of the metallic part of the piston with the seat 6 stands the brunt of the hard pressure, and any cutting action which may occur at this point of contact will be without effect in modifying the tightness of the valve.

When the valve opens it rises till piston 10 is entirely out of and some distance above the counterbore, the fluid then passing freely into the counterbore and out of the same through the passage formed by the flutes of the stem. When the valve closes the piston descends and starts to enter the counterbore, cutting off the major portion of the flow, the valve rapidly completing its closing stroke. During this closing motion there is no imprisonment whatever of fluid within the counterbore under the piston as any fluid in the counterbore is free to leave through the flutes of the stem. Proper rapidity of action is thus secured along with satisfactory tightness and satisfactory maintenance of good conditions.

I claim:—

In a valve, the combination, substantially as set forth, of a valve chamber having an inlet and outlet opening and provided with a partition having a counterbored opening between the inlet and outlet openings, a fluted valve stem fitting the smaller opening in the partition, a piston on said stem fitting said counterbore and adapted to seat upon the floor thereof, and a packing of soft material carried by the periphery of the piston and engaging the wall of the counterbore, whereby when the piston enters the counterbore any fluid between the piston and the floor of the counterbore may freely leave the counterbore through the flutes in the stem.

WILLARD THOMAS SEARS.

Witnesses:
ARCHIBALD M. O'BRIEN,
SAMUEL C. KANE.